United States Patent
Zarzycki

(10) Patent No.: US 8,417,825 B2
(45) Date of Patent: Apr. 9, 2013

(54) COMMUNICATIONS HANDLES AND PROXY AGENTS

(75) Inventor: David Alexander Zarzycki, Cupertino, CA (US)

(73) Assignee: Apple Inc., Cupertino, CA (US)

(*) Notice: Subject to any disclaimer, the term of this patent is extended or adjusted under 35 U.S.C. 154(b) by 1233 days.

(21) Appl. No.: 11/077,453

(22) Filed: Mar. 9, 2005

(65) Prior Publication Data

US 2006/0206595 A1    Sep. 14, 2006

(51) Int. Cl.
*G06F 15/177* (2006.01)
*G06F 9/00* (2006.01)
*G06F 9/22* (2006.01)

(52) U.S. Cl. .......... 709/228; 709/227; 713/1; 713/2

(58) Field of Classification Search .......... 709/203, 709/216, 218, 223, 231, 246; 707/3, 10, 707/101; 713/1, 2
See application file for complete search history.

(56) References Cited

U.S. PATENT DOCUMENTS

| | | | | |
|---|---|---|---|---|
| 5,367,635 A * | 11/1994 | Bauer et al. | ............... | 709/221 |
| 5,832,222 A * | 11/1998 | Dziadosz et al. | ............ | 709/216 |
| 5,870,550 A * | 2/1999 | Wesinger et al. | ............ | 709/218 |
| 6,453,356 B1 * | 9/2002 | Sheard et al. | ............... | 709/231 |
| 6,470,346 B2 * | 10/2002 | Morwood | ............... | 707/101 |
| 6,772,139 B1 * | 8/2004 | Smith, III | ............... | 707/3 |
| 6,859,217 B2 * | 2/2005 | Robertson et al. | ............ | 715/853 |
| 7,020,696 B1 * | 3/2006 | Perry et al. | ............... | 709/223 |
| 7,111,077 B1 * | 9/2006 | Starkovich et al. | ............ | 709/246 |
| 7,136,857 B2 * | 11/2006 | Chen et al. | ............... | 707/10 |
| 7,356,803 B2 * | 4/2008 | Bau et al. | ............... | 717/116 |
| 2001/0011304 A1 * | 8/2001 | Wesinger et al. | ............ | 709/227 |
| 2001/0047385 A1 * | 11/2001 | Tuatini | ............... | 709/203 |
| 2003/0018694 A1 * | 1/2003 | Chen et al. | ............... | 709/200 |
| 2003/0023712 A1 * | 1/2003 | Zhao et al. | ............... | 709/223 |
| 2003/0093500 A1 * | 5/2003 | Khodabakchian et al. | ... | 709/219 |
| 2005/0262188 A1 * | 11/2005 | Mamou et al. | ............... | 709/203 |
| 2006/0193295 A1 * | 8/2006 | White et al. | ............... | 370/336 |

* cited by examiner

*Primary Examiner* — Tae Kim

(74) *Attorney, Agent, or Firm* — Blakely, Sokoloff, Taylor & Zafman LLP

(57) ABSTRACT

Methods and apparatuses for proxying communication requests to services hosted on a data processing system. In one exemplary method, an open-ended configuration file is distilled to create an object tree from the configuration file. In addition, distillation creates communication handles for the services. The object tree is serialized and forwarded to a proxy agent. The proxy agent registers the service and monitors the communication handles for service requests by establishing a kernel callback. When a communication handle is readable, the proxy agent passes the communication handle to appropriate service.

26 Claims, 7 Drawing Sheets

COMMUNICATIONS HANDLES AND PROXY AGENTS

FIELD OF THE INVENTION

This invention relates generally to operating systems and more particularly to launching of services and handling of communications with the services.

BACKGROUND OF THE INVENTION

Modern computer operating systems host a number of services that require communications with internal and external clients. A service is an application or process that carries out some task on behalf of the client. Examples of services are, but not limited to: window services, directory services, web, email, file transfer, streaming audio and/or video, etc. Each service communicates with its clients through a communication handle. A communication handle is an identifier for a communication channel between the service and its client. Examples of communication handles are: sockets, Mach ports, file handles, pipes, etc.

Many services employing communication handles use the same structure to process initial communication requests from a client to a service. Consequently, development of standard programs assumed the processing of the common client communication requests to the services. Two mechanisms arose in UNIX-based operating systems, inetd and mach_init. Inetd is a program that launches services on demand. Furthermore, inetd listens for communication connections to the services made on Internet Protocol (IP) sockets. When a connection is made, inetd searches through its list of known services and passes the connection to proper service.

However, inetd is limited in several respects. First, inetd typically only handles communications on IP sockets. Second, inetd generally only allows a service to receive communications on one port. For example, a web server service can handle communications on ports 80 (HyperText Transfer Protocol (HTTP) for web page communications) and 443 (secure HTTP, or HTTPS). Thus, to use the web server service under inetd usually requires two running instances of web server service: one for HTTP communications and one for HTTPS communications. Having two web server services running wastes computer resources when one service could handle both types of service requests. In addition, inetd launches services on demand. Finally, inetd supports a limited form of input because a small number of parameters can be passed to a service when inetd starts the service. Thus, if a service uses a new input type passed through inetd, inetd needs to be modified to support the new input type.

Mach_init is similar to inetd except that mach_init listens for communications made on Mach ports. Mach_init maintains mappings between services and Mach ports that provide access to those services. In addition, mach_init launches the services on demand when a client requests a service and the service is not running. However, while mach_init supports multiple Mach ports per service, mach_init only monitors communications on Mach ports. Furthermore, mach_init does not support customizing service attributes or the service running environment.

SUMMARY OF THE DESCRIPTION

Methods and apparatuses for proxying communication requests to services hosted on a data processing system such as a computer are described. In one exemplary method, an open-ended configuration file is distilled to create an object tree from the configuration file. In addition, distillation creates communication handles for the services. The object tree is serialized and forwarded to a proxy agent. The proxy agent registers the service and monitors the communication handles for service requests by establishing a kernel callback. When a communication handle is readable, the proxy agent passes the communication handle to an appropriate service.

In addition, methods and apparatuses for launching software processes hosted on a data processing system such as a computer are described. In one exemplary method, a distiller creates a communication handle for a communication service. The distiller registers the communication service with a proxy agent by passing the communication handle to the proxy agent. The proxy agent launches the communication service. Other exemplary methods are described and machine readable media which data processing systems use to perform the various methods are also described.

BRIEF DESCRIPTION OF THE DRAWINGS

The present invention is illustrated by way of example and not limitation in the figures of the accompanying drawings in which like references indicate similar elements.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
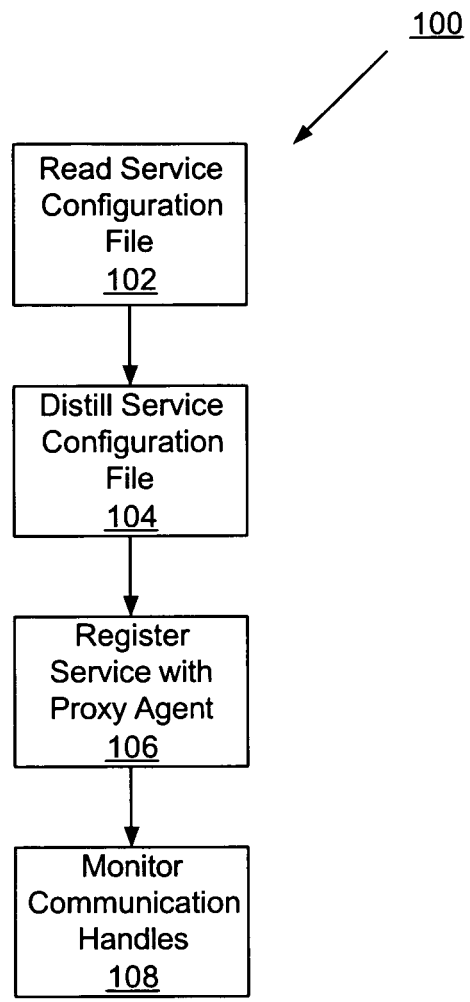
FIG. 1 is a flow chart of one embodiment of a method to proxy service communication requests with a proxy agent.
Figure 2:
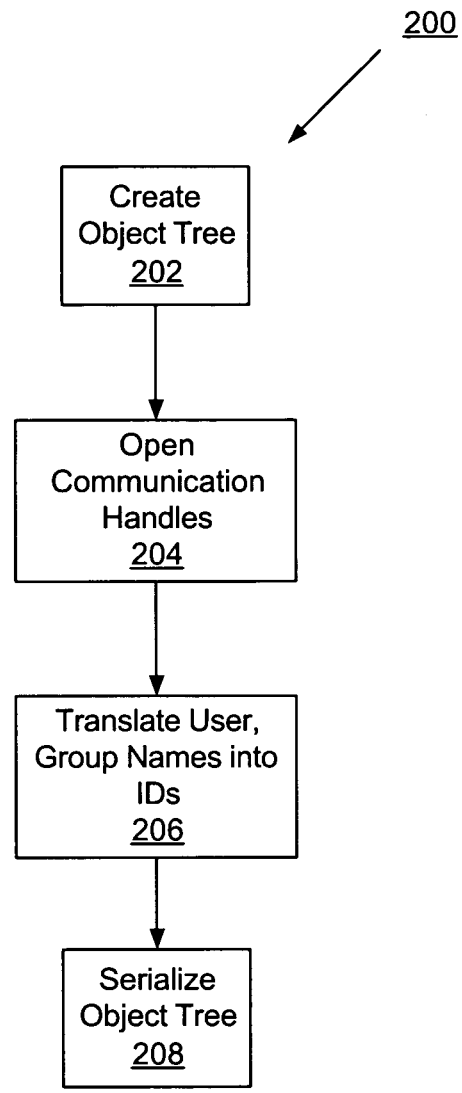
FIG. 2 is a flow chart of one embodiment of a method to distill a configuration file for services into a serialized object tree.
Figure 3:
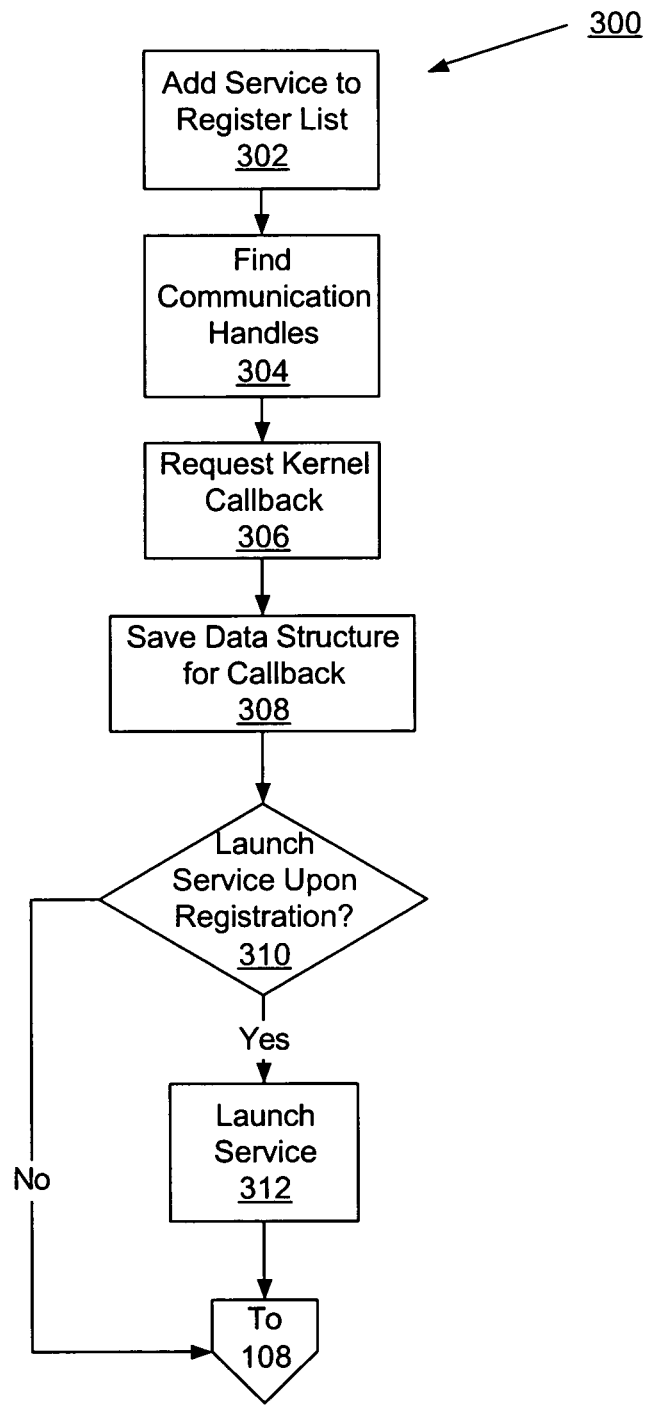
FIG. 3 is a flow chart of one embodiment of a method to register services with a proxy agent.
Figure 4:
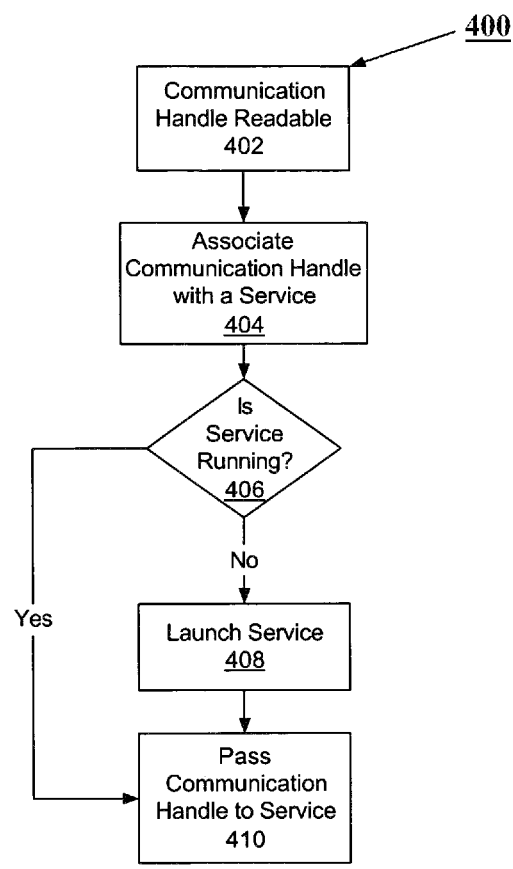
FIG. 4 is a flow chart of one embodiment of a method to monitor communication handles associated with registered services by a proxy agent.
Figure 5:
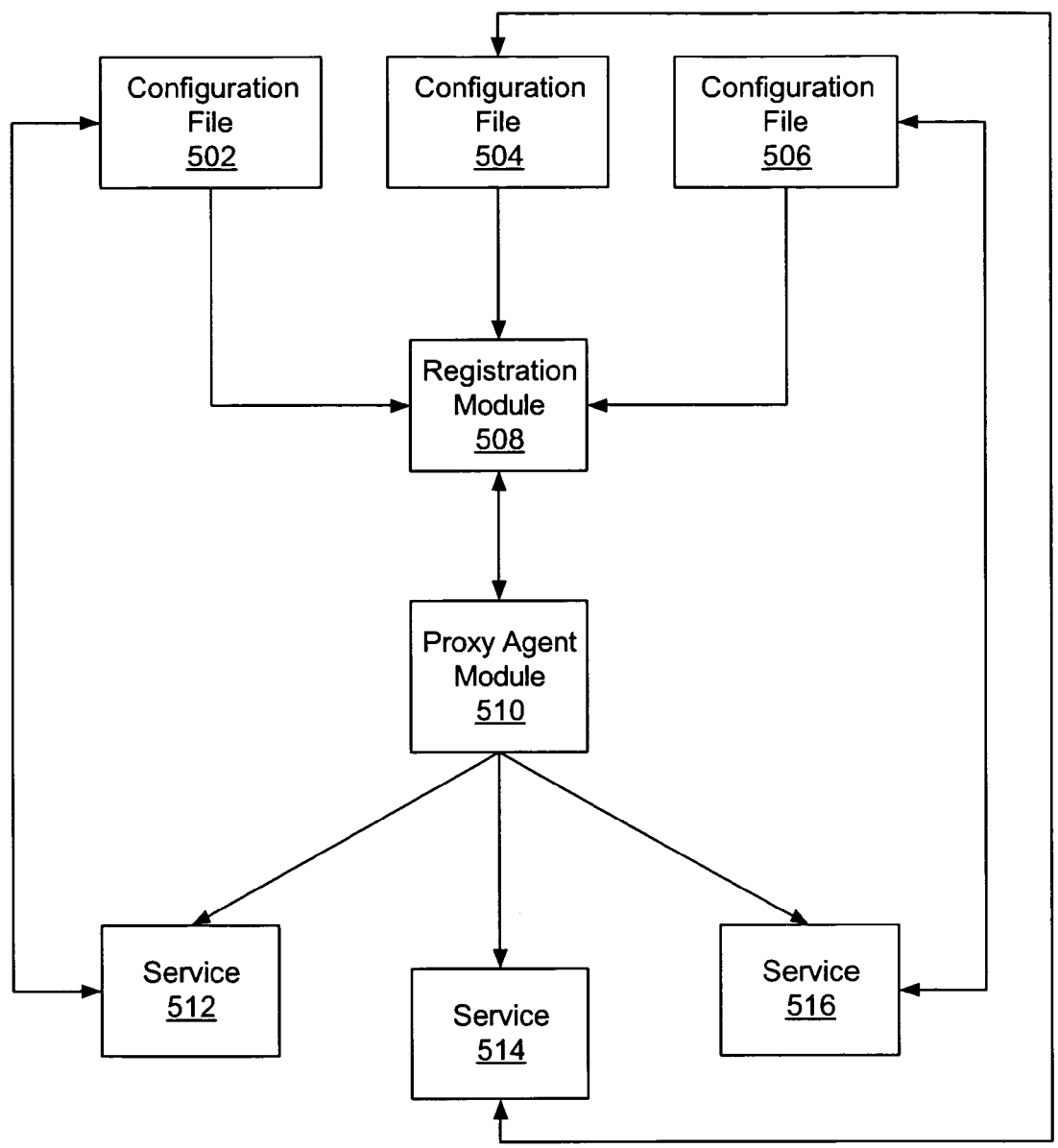
FIG. 5 is a block diagram illustrating a proxy agent system according to one embodiment of the invention.

FIG. 1 illustrates an embodiment of a method to proxy service communication requests with a proxy agent. Furthermore, the method distills a service configuration file and forwards the distilled configuration file to the proxy agent via a serialized object tree. FIG. 2 illustrates one embodiment of a method to distill a configuration file for a service. FIG. 3 illustrates one embodiment of a method to register services with a proxy agent. FIG. 4 illustrates one embodiment of a method to manage incoming service requests and forward the service requests to the appropriate service. FIG. 5 illustrates one embodiment of the proxy agent system that implements FIGS. 1-4.

FIG. 1 is a flow chart of one embodiment of a method 100 to proxy service communication requests with a proxy agent. At block 102, method 100 reads the service configuration file. In an exemplary embodiment the service configuration file is an eXtensible Markup Language (XML) file. XML is a standard capable of describing many different kinds of data in a plain text file. Thus, XML enables the configuration file to contain a wide variety of input types for the service.

In an exemplary embodiment, the configuration file comprises similar input supported by inetd, such as the service name and the user and group used to run the service. Furthermore, the configuration file contains a wide variety of communication handles that are used by the service to communicate with its clients. The communication handles represent, but not limited to, IP sockets, Mach ports, file handles, pipes, etc. In addition, the configuration file allows a service to be started on demand, pass arguments to the service, set the root and working directory of the service, set the service environment and set a service priority value. Alternatively, the configuration file does not comprise similar input supported by inetd. Instead the inetd information is preserved and method 100 uses the inetd information.

An exemplary embodiment of the configuration file structure and contents is shown here in Table A. An alternate embodiment of the configuration file may be a plain text file other than an XML file. Alternatively, the configuration file may be binary file.

TABLE A

Sample XML Configuration File.

```
<?xml version="1.0" encoding="UTF-8"?>
<!DOCTYPE plist PUBLIC -//Apple Computer//DTD PLIST
1.0//EN
http://www.apple.com/DTDs/PropertyList-1.0.dtd>
<plist version="1.0">
<dict>
    <key>Label</key>
    <string>com.example.exampled</string>
    <key>ProgramArguments</key>
    <array>
        <string>exampled></string>
    </array>
    <key>OnDemand</key>
    <false/>
    <key>ServiceIPC</key>
    <false/>
</dict>
</plist>
```

At block 104, the method 100 distills the configuration file. Distilling is the process of converting the configuration file into a form that is readily usable by the proxy agent. In an exemplary embodiment of distillation, method 100 opens all the communication handles identified in the configuration file. In addition, method 100 converts the user/group name to user/group IDs. Furthermore, method 100 converts other information from the configuration file into a form that can be passed to the proxy agent. Distillation is further described in FIG. 2.

Returning to FIG. 1, at block 106, method 100 registers the service using the converted information with the proxy agent. In one embodiment, method 100 registers the service by sending the converted information to the proxy agent. In particular, the proxy agent registers the service by storing the service name in a monitoring list and retrieves the communications handles from the converted information. Furthermore, the service can be launched upon registration if desired. Registration is further described in FIG. 3.

Returning to FIG. 1, at block 108, method 100 monitors the known communications handles associated with registered services. When method 100 receives a signal that one of the communications handles that method 100 knows about is readable, method 100 passes the communication handle to the appropriate service. A readable communication handle means that data can be read from the communication channel associated with the communication handle. Typically the operating system signals method 100, although other signaling mechanisms that alert a process when a communication handle is readable can be used. For example, consider a client sending web server request on an IP socket at port 80. When the request arrives at the computer hosting the web server service, the IP socket bound to port 80 becomes readable because the request is ready to be read by the web server service. Monitoring communication handles is further described in FIG. 4.

Although method 100 is described in terms of a general scheme to handle arbitrary communication requests received by the operating system, in an alternative embodiment, method 100 could equivalently be used by a specialized set of related services, such as a web or e-mail server. For example, a web server may have several sub-services, such web page, secure web page and administration services. In this example, method 100 distills the configuration files for each of the web sub-services, including opening the communication handles associated with each sub-service. In addition, method 100 constructs an object tree representing the configuration file, where the object tree includes the opened communication handles. Method 100 registers the sub-service with a proxy agent by serializing the object tree and sending the object tree to the proxy agent. In this alternative embodiment, the proxy agent is a specialized web server proxy agent. In a further embodiment, the proxy agent is the proxy agent used to handle all other services. Method 100 monitors communication requests for the web sub-services and forwards the communication requests to the appropriate web sub-service. Applying method 100 to a group of specially related sub-services, such as a web server, allows the software processes implementing the distilling, registering and proxy agent functions to be tailored to the special needs of the web service and the related group of sub-services. This alternative embodiment can be applied to applications that have a group of related sub-services. Examples of such applications are, but not limited to, web services, e-mail services, file transfer services, database management systems, etc.

FIG. 2 is a flow chart of one embodiment of a method 200 to distill a configuration file for services into a serialized object tree. Distillation by method 200 allows knowledge about the configuration parameter type to be contained in the application performing method 200, not the proxy agent. In block 202, method 200 creates the object tree from the information stored in the configuration file. An object tree is a grouping of objects with each object as a node in the tree. The top node (root object) is at the top of the structure and does not have a parent node. All other objects have a single parent. Objects contained by parent objects are child objects. Several ways are known in the art to create an object tree from an XML file. In one exemplary embodiment, each XML tag represents an object, where each XML attribute contained in the associated XML tag is a field within the object. Furthermore, each XML subtag contained within an XML tag represents a child object contained by the parent object. Method

200 processes the XML file, converting tags in object node and subtags into object child nodes.

In block 204, method 200 scans the object tree for communications handles that method 200 knows about and opens them. In an exemplary embodiment, method 200 opens communication handles by inspecting each object when method 200 adds the object to the object tree. Method 200 identifies the XML tag as being a communication handle method 200 recognizes and opens the handle through the appropriate system call. For example, a web server service typically listens for web requests on an IP socket bound to port 80. Consequently, the configuration file for the web server service specifies an IP socket bound to port 80. Method 200 opens such a socket and stores the communication handle for the opened socket in the object tree associated with the web server service. Alternatively, method 200 scans the object tree once the object tree is constructed. Method 200 recognizes communications handles including, but not limited to, sockets, Mach ports, operating system file handles, pipes, etc.

In block 206, method 200 translates user and group name text strings into operating system dependent user and group identifiers. In an exemplary embodiment, method 200 translates the user and group names by inspecting each object when method 200 adds the object to the object tree. Alternatively, method 200 scans the object tree translating the user and group names once the object tree is constructed.

In block 208, method 200 serializes the object tree. Serialization is the process of converting of an object's contents and the tree's structure into a form that can be readily transmitted to a different process. The different process then can restore the object and tree structure. In an exemplary embodiment, the object tree is converted into a serialized data stream. The stream is transmitted to the proxy agent via Interprocess Communications (IPC). Alternatively, the object tree is transmitted to the proxy agent via XML Remote Procedure Call (RPC).

FIG. 3 is a flow chart of one embodiment of a method 300 to register services with a proxy agent. In block 302, method 300 adds the service to the register list. In one embodiment, method 300 receives the serialized object tree associated with the service and reconstructs the object tree. Method 300 adds the service to the list of services and associates the object tree with the newly registered service.

In block 304, method 300 walks the object tree for communication handles. In one embodiment, method 300 walks the object tree examining the top object node in the tree for communication handles. If a communication handle is found, method 300 associates the communication handle with the appropriate service. Furthermore, method 300 examines each child object for communication handles. Method 300 recursively examines each object node and object child node for communication handles until all objects in the objects are examined. Alternatively, there are several equivalent procedures known in the art for walking an object tree.

Unlike inetd described above, method 300 can associate multiple communication handles with each service. This is particularly useful for a service that receives messages on multiple communication handles. For example, a web server service can process normal web requests on port 80 and secure web requests on port 443. Furthermore, the web server service may have an additional web service (e.g. administrative web service) bound to another port. Using inetd, a web server supporting these three different services would require three instances of the web service actively running. However, method 300 allows one instance of the service running with three different ports being monitored for the one instance of the service. Monitoring multiple communication handles for one service reduces the amount of computational resources consumed by the service.

In block 306, method 300 requests a kernel callback for each communication handle found in the object tree. A kernel callback is a function that is invoked when some event is detected by the kernel. The kernel callback used here is when a communication handle becomes readable. In an exemplary embodiment, method 300 registers a kernel callback with the communication handle and a data structure comprising a pointer to the function invoked when the communication handle is readable, the object tree, the process ID of the service and an additional data structure used for managing the list of services. The function invoked is the top-level function for the service associated with the communication handle. Once the function is invoked, the service processes the messages available through the communication handle. In block 308, the data structure associated with the callback is saved.

In block 310, method 300 determines if the registered service should be launched upon registration or launched when the communication handle associated with the service becomes readable. If the service should be launched upon registration, method 300 launches the service. Launching a service means that method 300 executes the service, so that the service is running and ready to respond to messages on the communication handles associated with the service. Method 300 typically invokes an operating system call or some other software entity to launch the service. The advantage of launching services upon registration is that the service is ready to immediately respond to messages. However, the disadvantage is that a running service consumes computer resources. Launching upon registration is typically used for services that require special non-demand initialization. Examples of such services are, but not limited to, window services, logon services, web server, etc. Regardless of whether the service is launched, control passes to block 108.

FIG. 4 is a flow chart of one embodiment of a method 400 to monitor communication handles associated with registered services by a proxy agent. In block 402, method 400 determines if a communication handle is readable. In an exemplary embodiment, the kernel signals via the callback to method 400 a communication handle is readable by invoking the callback associated with the communication handle. The kernel returns the data structure stored with the kernel callback in block 306, FIG. 3. The advantage of having the data structure returned is that method 400 can directly invoked the appropriate function for the service. This is a faster way to invoke a service because method 400 knows which function to invoke without searching through the list of readable sockets. This is especially advantageous for services requiring low latency response (e.g. window drawing services). In block 404, method 400 associates the readable communication handle with the service.

In block 406, method 400 determines if the service is running. If not, method 400 launches the service at block 408. Method 400 typically invokes an operating system call or some other software entity to launch the service. This technique launches services on-demand. On-demand services are useful for services that are not used often or services that do not require a low latency response. Examples of on-demand services are, but not limited to, printing services, file transfer services, etc.

Another advantage of on-demand launching is that a large group of services can be registered without worrying about service launch dependencies. Launching service immediately (or upon registration) is problematic if one service requires that second service running. Thus, the second service needs to be launched before the first service to ensure the first service works adequately. While it is simple to set the launch sequences for two services with one dependency between them, it is much more problematic with several services involving multiple service dependencies. A simple solution is to register the group of services at the same time for on-demand launching. By launching on-demand, the services dependencies are worked out automatically. Using the simple example of two services above, where service 2 depends on service 1, both services are registered and in a state to be launched on-demand. If service 2 receives a request, service 2 is launched. Because service 2 depends on service 1, service 2 sends a request to service 1. Service 1 is launched and handles the request from service 2. Service 2, in turn handles its service request. From either block 406 or block 408, control passes to block 410.

In block 410, method 400 passes the communication handles to the appropriate service via the service's object tree. In an exemplary embodiment, method 400 invokes the function associated with the service identified in the kernel callback data structure. The service's object tree is passed to the function when method 400 invokes the function. The service retrieves the communications handles from the object tree.

FIG. 5 is a block diagram illustrating a proxy agent system 500 according to one embodiment of the invention. In system 500, registration module 508 loads several configuration files 502-506. Configuration files 502-506 are associated with services 512-516 and are used to configure services 512-516. In one embodiment, configuration files are XML files. In an alternate embodiment, configuration files 502-506 are plain text files other than XML. In a further alternate embodiment, configuration files 502-506 are binary files.

Registration module 508 distills the loaded configuration files 502-506 into several object trees. In an exemplary embodiment, registration module 508 distills a configuration file by creating an object tree based on the information in the object tree, opening any communication handles contained in the configuration file and coveting user/group names into user/group IDs. In this embodiment and referring back to FIG. 1, registration modules performs the function contained in blocks 102 and 104.

Returning back to FIG. 5, registration modules serializes each object tree created from configuration files 502-506. Registration module 508 registers services 512-516 with proxy agent module 510 by sending the serialized object trees to the proxy agent module 510. For each serialized object tree received, proxy agent module 510 reconstructs the object tree and scans the object tree for communication handles. For each communication handle found, proxy agent 510 registers a kernel callback, where the callback is triggered when the communication handle becomes readable. If requested, proxy agent module 510 launches each service upon registration. Referring back to FIG. 1, registration module 508 and proxy agent module 510 perform the function contained in block 106.

Returning back to FIG. 5, proxy agent module 510 monitors the communication handles for callbacks from the kernel that a communication handle is readable. Once a communication handle becomes readable, proxy agent module 510 determines which service is associated with the readable communication handle. If the service is not running, proxy agent module 510 launches the appropriate service. Proxy agent module 510 passes the communication handle to the service by invoking the appropriate function of the service and passing the service's object tree. Referring back to FIG. 1, proxy agent module 510 performs the function contained in block 108. In an exemplary embodiment, the registration and proxy agent modules are separate software processes. Alternatively, the same two modules are part of the same software process.

In practice, the methods described herein may constitute one or more programs made up of machine-executable instructions. Describing the method with reference to the flowchart in FIGS. 1-4 enables one skilled in the art to develop such programs, including such instructions to carry out the operations (acts) represented by logical blocks on suitably configured machines (the processor of the machine executing the instructions from machine-readable media, such as RAM (e.g. DRAM), ROM, nonvolatile storage media (e.g. hard drive or CD-ROM), etc.). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein.

Figure 6:
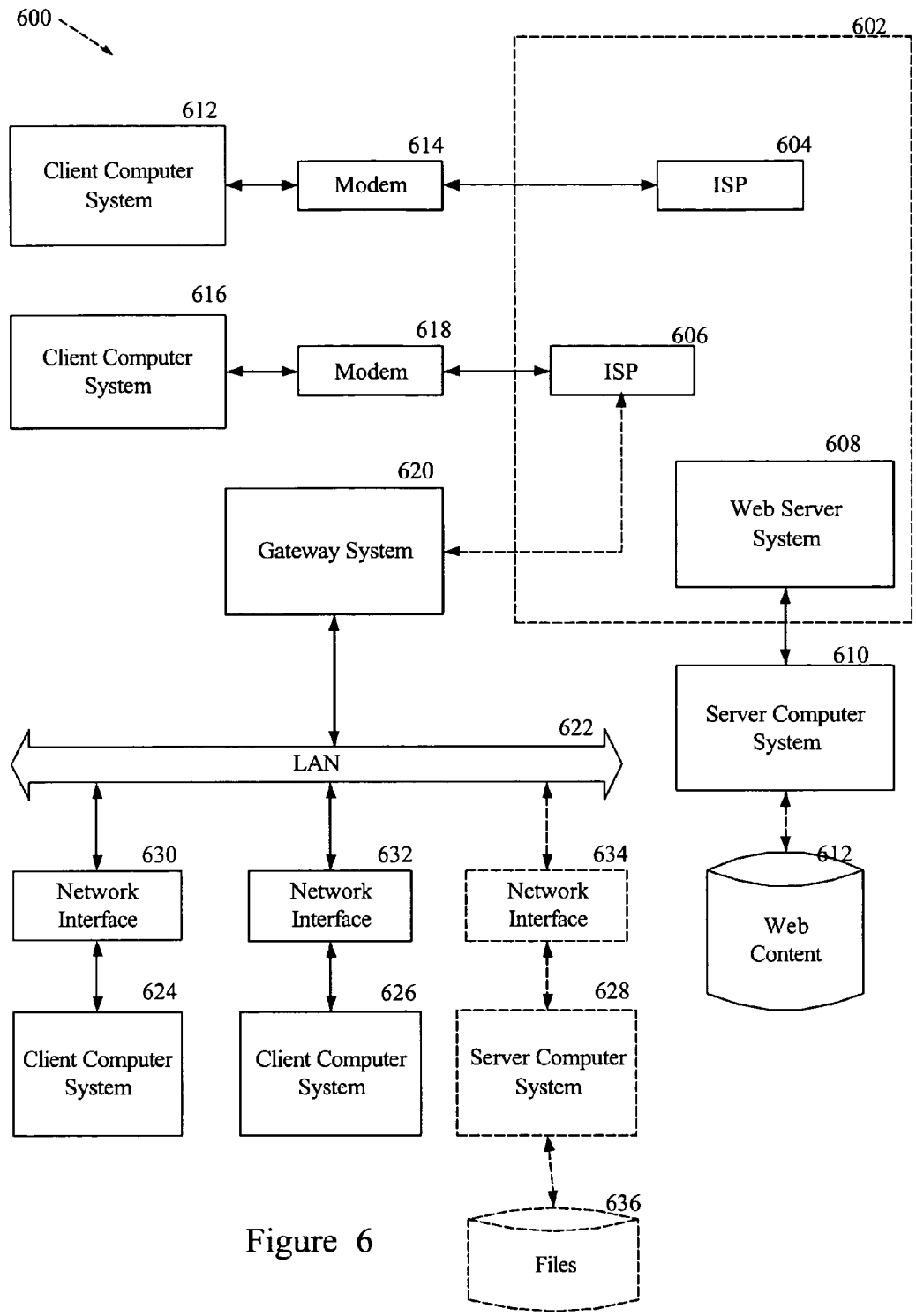
FIG. 6 is a diagram of one embodiment of an operating environment suitable for practicing the present invention.

FIG. 6 shows several computer systems 600 that are coupled together through a network 602, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 602 is typically provided by Internet service providers (ISP), such as the ISPs 604 and 606. Users on client systems, such as client computer systems 612, 616, 624, and 626 obtain access to the Internet through the Internet service providers, such as ISPs 604 and 606. Access to the Internet allows users of the client computer systems to exchange information, receive and send e-mails, and view documents, such as documents which have been prepared in the HTML format. These documents are often provided by web servers, such as web server 608 which is considered to be "on" the Internet. Often these web servers are provided by the ISPs, such as ISP 604, although a computer system can be set up and connected to the Internet without that system being also an ISP as is well known in the art.

The web server 608 is typically at least one computer system which operates as a server computer system and is configured to operate with the protocols of the World Wide Web and is coupled to the Internet. Optionally, the web server 608 can be part of an ISP which provides access to the Internet for client systems. The web server 608 is shown coupled to the server computer system 610 which itself is coupled to web content 612, which can be considered a form of a media database. It will be appreciated that while two computer systems 608 and 610 are shown in FIG. 6, the web server system 608 and the server computer system 610 can be one computer system having different software components providing the web server functionality and the server functionality provided by the server computer system 610 which will be described further below.

Client computer systems 612, 616, 624, and 626 can each, with the appropriate web browsing software, view HTML pages provided by the web server 608. The ISP 604 provides Internet connectivity to the client computer system 612 through the modem interface 614 which can be considered part of the client computer system 612. The client computer system can be a personal computer system, a network computer, a Web TV system, a handheld device, or other such computer system. Similarly, the ISP 606 provides Internet connectivity for client systems 616, 624, and 626, although as shown in FIG. 6, the connections are not the same for these three computer systems. Client computer system 616 is coupled through a modem interface 618 while client computer systems 624 and 626 are part of a LAN. While FIG. 6 shows the interfaces 614 and 618 as generically as a "modem," it will be appreciated that each of these interfaces can be an analog modem, ISDN modem, cable modem, satellite transmission interface, or other interfaces for coupling a computer system to other computer systems. Client computer systems 624 and 616 are coupled to a LAN 622 through network interfaces 630 and 632, which can be Ethernet network or other network interfaces. The LAN 622 is also coupled to a gateway computer system 620 which can provide firewall and other Internet related services for the local area network. This gateway computer system 620 is coupled to the ISP 606 to provide Internet connectivity to the client computer systems 624 and 626. The gateway computer system 620 can be a conventional server computer system. Also, the web server system 608 can be a conventional server computer system.

Alternatively, as well-known, a server computer system 628 can be directly coupled to the LAN 622 through a network interface 634 to provide files 636 and other services to the clients 624, 626, without the need to connect to the Internet through the gateway system 620. Furthermore, any combination of client systems 612, 616, 624, 626 may be connected together in a peer-to-peer network using LAN 622, Internet 602 or a combination as a communications medium. Generally, a peer-to-peer network distributes data across a network of multiple machines for storage and retrieval without the use of a central server or servers. Thus, each peer network node may incorporate the functions of both the client and the server described above.

Figure 7:
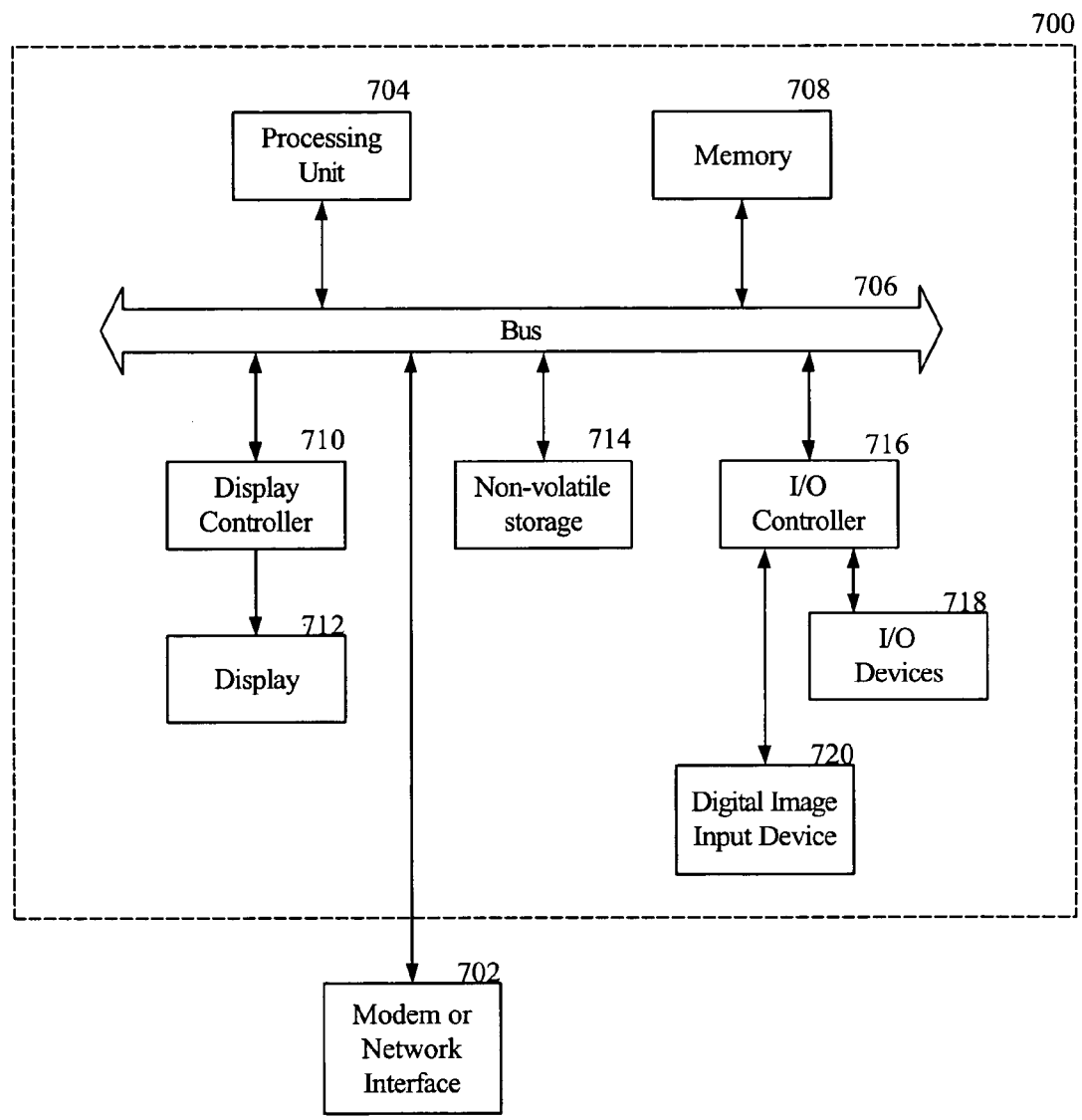
FIG. 7 is a diagram of one embodiment of a data processing system, such as a general purpose computer system, suitable for use in the operating environment of FIG. 1.

The following description of FIG. 7 is intended to provide an overview of computer hardware and other operating components suitable for performing the methods of the invention described above, but is not intended to limit the applicable environments. One of skill in the art will immediately appreciate that the embodiments of the invention can be practiced with other computer system configurations, including set-top boxes, hand-held devices, multiprocessor systems, microprocessor-based or programmable consumer electronics, network PCs, minicomputers, mainframe computers, and the like. The embodiments of the invention can also be practiced in distributed computing environments where tasks are performed by remote processing devices that are linked through a communications network, such as peer-to-peer network infrastructure.

FIG. 7 shows one example of a conventional computer system that can be used in one or more aspects of the invention. The computer system 700 interfaces to external systems through the modem or network interface 702. It will be appreciated that the modem or network interface 702 can be considered to be part of the computer system 700. This interface 702 can be an analog modem, ISDN modem, cable modem, token ring interface, satellite transmission interface, or other interfaces for coupling a computer system to other computer systems. The computer system 702 includes a processing unit 704, which can be a conventional microprocessor such as an Intel Pentium microprocessor or Motorola Power PC microprocessor. Memory 708 is coupled to the processor 704 by a bus 706. Memory 708 can be dynamic random access memory (DRAM) and can also include static RAM (SRAM). The bus 706 couples the processor 704 to the memory 708 and also to non-volatile storage 714 and to display controller 710 and to the input/output (I/O) controller 716. The display controller 710 controls in the conventional manner a display on a display device 712 which can be a cathode ray tube (CRT) or liquid crystal display (LCD). The input/output devices 718 can include a keyboard, disk drives, printers, a scanner, and other input and output devices, including a mouse or other pointing device. The display controller 710 and the I/O controller 716 can be implemented with conventional well known technology. A digital image input device 720 can be a digital camera which is coupled to an I/O controller 716 in order to allow images from the digital camera to be input into the computer system 700. The non-volatile storage 714 is often a magnetic hard disk, an optical disk, or another form of storage for large amounts of data. Some of this data is often written, by a direct memory access process, into memory 708 during execution of software in the computer system 700. One of skill in the art will immediately recognize that the terms "computer-readable medium" and "machine-readable medium" include any type of storage device that is accessible by the processor 704 or by other data processing systems such as cellular telephones or personal digital assistants or MP3 players, etc. and also encompass a carrier wave that encodes a data signal.

Network computers are another type of computer system that can be used with the embodiments of the present invention. Network computers do not usually include a hard disk or other mass storage, and the executable programs are loaded from a network connection into the memory 708 for execution by the processor 704. A Web TV system, which is known in the art, is also considered to be a computer system according to the embodiments of the present invention, but it may lack some of the features shown in FIG. 7, such as certain input or output devices. A typical computer system will usually include at least a processor, memory, and a bus coupling the memory to the processor.

It will be appreciated that the computer system 700 is one example of many possible computer systems, which have different architectures. For example, personal computers based on an Intel microprocessor often have multiple buses, one of which can be an input/output (I/O) bus for the peripherals and one that directly connects the processor 704 and the memory 708 (often referred to as a memory bus). The buses are connected together through bridge components that perform any necessary translation due to differing bus protocols.

It will also be appreciated that the computer system 700 is controlled by operating system software, which includes a file management system, such as a disk operating system, which is part of the operating system software. One example of an operating system software with its associated file management system software is the family of operating systems known as MAC OS X from Apple Corporation in Cupertino, Calif., and their associated file management systems. The file management system is typically stored in the non-volatile storage 714 and causes the processor 704 to execute the various acts required by the operating system to input and output data and to store data in memory, including storing files on the non-volatile storage 714.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
    prior to launching a service,
        distilling a configuration file by a computer, the configuration file comprises a plurality of objects for configuring the service that runs on the computer, wherein the service includes a plurality of sub-services, with each of the plurality of sub-services serving a different function of the service, and that sub-service is bound to a different operating system port and, the distilling comprises,
            creating multiple contemporaneously opened communication handles, wherein each communication handle creation includes,
                opening a communication handle for the service prior to launching the service, wherein the communication handle is associated with an object from the plurality of objects, is bound to a different one of the plurality of sub-services, is an identification for a communication channel between the service and a client, and includes the operating system port corresponding to the different one of the plurality of sub-services;
        creating a serialized object tree from the plurality of objects, the serialized object tree comprises the multiple contemporaneously opened communication handles;
        registering the service with a proxy agent, said registering comprises forwarding the serialized object tree to the proxy agent to allow an operating system kernel callback to return a data structure stored with the kernel callback for the service with the multiple contemporaneously opened communication handles; and
    launching the service with the proxy agent.

2. The method of claim 1, wherein the launching the service is in response to receiving a request to the service.

3. The method of claim 1, wherein the launching the service is in response to the registering the service.

4. The method of claim 1, wherein the distilling further comprises creating a second communication handle associated with the object.

5. The method of claim 1, wherein the distilling a configuration file comprises:
    creating an object tree from the plurality of objects;
    translating a user name associated with the plurality of objects into a user ID; and
    translating a group name associated with the plurality of objects into a group ID.

6. The method of claim 1, wherein registering the service with a proxy agent comprises:
    adding the service to a register list; and
    retrieving the multiple contemporaneously opened communication handles from the serialized object tree.

7. The method of claim 1, wherein the multiple contemporaneously opened communication handle is selected from the group consisting of an Internet Protocol socket, and a Mach port.

8. The method of claim 1, wherein the plurality of objects further comprise at least one of a user name, a group name, a root directory, a working directory, a priority value and a value indicating the service launches on demand.

9. A method for launching a software process, the method comprising:
    retrieving, by a computer operating system kernel callback prior to launching a communication service on that computer, a data structure stored with the kernel callback containing a plurality of contemporaneously opened communication handles for the communication service that runs on the computer, wherein each of the plurality of contemporaneously opened communication handles is opened prior to the launching of the communication service, each of the plurality of contemporaneously opened communication handles is an identification for an opened communication channel between the service and a client, each of the plurality of contemporaneously opened communication handles is bound to a different sub-service of the communication service, wherein each of the different sub-services serves a different function of the communication service, each of the different sub-services is bound to a different operating system port and, each of the plurality of contemporaneously opened communication handles includes the operating system port corresponding to the different one of the plurality of sub-services;
    registering the communication service with a proxy agent by passing the plurality of contemporaneously opened communication handles from the data structure to the proxy agent; and
    launching the communication service with the data structure and the proxy agent, wherein a software entity responsible for creating the plurality of contemporaneously opened communication handles is separate from a software entity responsible for said launching.

10. The method of claim 9, wherein the launching the communication service is in response to receiving a request to the communication service.

11. The method of claim 9, wherein the launching the communication service is in response to the registering the communication service.

12. The method of claim 9, wherein the registering the communication service with a proxy agent comprises:
    adding the communication service to a register list;
    retrieving the plurality of contemporaneously opened communication handles from a serialized object tree; and
    requesting a kernel callback for the communication service for each of the plurality of contemporaneously opened communication handles.

13. The method of claim 9, wherein the plurality of contemporaneously opened communication handle is selected from the group consisting of an Internet Protocol socket, and a Mach port.

14. A method for launching a service comprising:
    prior to launching a service, wherein the service includes a plurality of sub-services with each of the plurality of sub-services serving a different function of the service, and that sub-service is bound to a different operating system port,
    distilling, by a computer, a configuration file with a distillation agent, wherein the distilling comprises, reading a set of configuration information associated with the service, creating contemporaneously opening multiple communication handles, wherein each of the multiple communication handles is bound to a different one of the plurality of sub-services, is an identification for a communication channel between the service and a client, and includes the operating system port corresponding to the different one of the plurality of sub-services and, converting at least some information in the configuration file into an operating system dependent user identifier, the set of configuration information comprises the multiple contemporaneously opened communication handles created and opened by the distilling and the operating system kernel callback dependent information;

registering the service with a proxy agent by passing the set of configuration information to the proxy agent; and causing a launching of the service with a data structure stored with the kernel callback and the proxy agent, the service to run on a computer.

15. A non-transitory machine-readable storage medium having executable instructions, which when executed by a processor, cause the processor to perform a method comprising:

prior to launching a service, distilling a configuration file by a computer, the configuration file comprises a plurality of objects for configuring the service that runs on a computer, wherein the service includes a plurality of sub-services with each of the plurality of sub-services serving a different function of the service, and that sub-service is bound to a different operating system port and, the distilling comprises, creating multiple contemporaneously opened communication handles, wherein each communication handle creation includes, opening a communication handle for the service prior to launching the service, wherein the communication handle is associated with an object from the plurality of objects, is bound to a different one of the plurality of sub-services, is an identification for a communication channel between the service and a client, and includes the operating system port corresponding to the different one of the plurality of sub-services;

creating a serialized object tree from the plurality of objects, the serialized object tree comprises the multiple contemporaneously opened communication handles;

registering the service with a proxy agent, said registering comprises forwarding the serialized object tree to the proxy agent to allow an operating system kernel callback to return a data structure stored with the kernel callback for the service with the multiple contemporaneously opened communication handles;

launching the service with the proxy agent.

16. The non-transitory machine-readable storage medium of claim 15, wherein the distilling a configuration file comprises:

creating an object tree from the plurality of objects;
translating a user name associated with the plurality of objects into a user ID; and
translating a group name associated with the plurality of objects into a group ID.

17. The non-transitory machine-readable storage medium of claim 15, wherein registering the service with a proxy agent comprises:

adding the service to a register list; and
retrieving the multiple contemporaneously opened communication handles from the serialized object tree.

18. A non-transitory machine-readable storage medium having executable instructions, which when executed by a processor, cause the processor to perform a method for launching a software process, the method comprising:

retrieving, by a computer operating system kernel callback prior to launching a communication service on that computer, a data structure stored with the kernel callback containing a plurality of contemporaneously opened communication handles for the communication service that runs on the computer, wherein each of the plurality of contemporaneously opened communication handles is opened prior to the launching of the communication service, each of the plurality of contemporaneously opened communication handles is an identification for an opened communication channel between the service and a client, each of the plurality of contemporaneously opened communication handles is bound to a different sub-service of the communication service, wherein each of the different sub-services serves a different function of the communication service, each of the different sub-services is bound to a different operating system port and, each of the plurality of contemporaneously opened communication handles includes the operating system port corresponding to the different one of the plurality of sub-services;

registering the communication service with a proxy agent by passing the plurality of contemporaneously opened communication handle from the data structure to the proxy agent; and launching the communication service with the data structure and the proxy agent, wherein a software entity responsible for creating the plurality of contemporaneously opened communication handles is separate from a software entity responsible for said launching.

19. The non-transitory machine-readable storage medium of claim 18, wherein the registering the communication service with a proxy agent comprises:

adding the communication service to a register list;
retrieving the plurality of contemporaneously opened communication handles from a serialized object tree; and
requesting a kernel callback for the communication service for each of the plurality of contemporaneously opened communication handles.

20. A non-transitory machine-readable storage medium having executable instructions, which when executed by a processor, cause the processor to perform a method for launching a software process, the method comprising:

prior to launching a service, wherein the service includes a plurality of sub-services with each of the plurality of sub-services serving a different function of the service, and that sub-service is bound to a different operating system port, distilling, by a computer, a configuration file with a distillation agent, wherein the distilling comprises, reading a set of configuration information associated with the service, creating contemporaneously opening multiple communication handles, wherein each of the multiple communication handles is bound to a different one of the plurality of sub-services, is an identification for a communication channel between the service and a client, and includes the operating system port corresponding to the different one of the plurality of sub-services and, converting at least some information in the configuration file into an operating system dependent user identifier, the set of configuration information comprises the multiple contemporaneously opened communication handles created and opened by the distilling and the operating system kernel callback dependent information;

registering the service with a proxy agent by passing the set of configuration information from the operating system dependent information to the proxy agent; and causing a launching of the service with the proxy agent.

21. An apparatus comprising:

means for distilling a configuration file prior to launching a service, the configuration file comprises a plurality of objects for configuring a service that runs on a computer, wherein the service includes a plurality of sub-services, with each of the plurality of sub-services serving a different function of the service, and that sub-service is bound to a different operating system port and the means for distilling comprises means for creating multiple contemporaneously opened communication handles and each means for creating includes means opening a communication handle for the service prior to launching the service, the communication handle is associated with an object from the plurality of objects, is bound to a different one of the plurality of sub-services, is an identification for a communication channel between the service and a client, and includes the operating system port corresponding to the different one of the plurality of sub-services;

means for creating a serialized object tree from the plurality of objects, the serialized object tree comprises the multiple contemporaneously opened communication handles;

means for registering the service with a proxy agent, said registering comprises means for forwarding the serialized object tree to the proxy agent to allow an operating system kernel callback to return a data structure stored with the kernel callback for the service with the multiple contemporaneously opened communication handles; and means for launching a service.

22. The apparatus of claim 21, wherein the means for distilling a configuration file comprises:

means for creating an object tree from the plurality of objects;

means for translating a user name associated with the plurality of objects into a user ID; and means for translating a group name associated with the plurality of objects into a group ID.

23. The apparatus of claim 21, wherein the means for registering the service with a proxy agent comprises:

means for adding the service to a register list;

means for retrieving the multiple contemporaneously opened communication handles from the serialized object tree.

24. An apparatus for launching a software process, the apparatus comprising:

means for retrieving, by a computer operating system kernel callback prior to launching a communication service on that computer, a data structure stored with the kernel callback containing a plurality of contemporaneously opened communication handles for the communication service that runs on the computer, wherein each of the plurality of contemporaneously opened communication handles is opened prior to the launching of the communication service, is an identification for an opened communication channel between the service and a client, is bound to a different sub-service of the communication service and includes the operating system port corresponding to the different one of the plurality of sub-services, wherein each of the different sub-services serves a different function of the communication service, and is bound to a different operating system port;

means for registering the communication service with a proxy agent by passing the plurality of contemporaneously opened communication handle from the data structure to the proxy agent; and means for launching the communication service with the data structure and the proxy agent, wherein a software entity responsible for creating the plurality of contemporaneously opened communication handles is separate from a software entity responsible for said launching.

25. The apparatus of claim 24, wherein the registering the communication service with a proxy agent comprises:

means for adding the communication service to a register list;

means for retrieving the plurality of contemporaneously opened communication handles from a serialized object tree; and means for requesting a kernel callback for the communication service for each of the plurality of contemporaneously opened communication handles.

26. An apparatus for launching a service comprising:

means for distilling a configuration file with a distillation agent prior to launching a service, wherein the service includes a plurality of sub-services with each of the plurality of sub-services serving a different function of the service, and that sub-service is bound to a different operating system port and, the distilling comprises means for reading a set of configuration information associated with the service, means for creating contemporaneously opening multiple communication handles, wherein each of the multiple communication handles is bound to a different one of the plurality of sub-services, is an identification for a communication channel between the service and a client, and includes the operating system port corresponding to the different one of the plurality of sub-services, and means for converting at least some information in the configuration file into an operating system dependent user identifier, the set of configuration information comprises the multiple contemporaneously opened communication handles created and opened by the distilling and the operating system kernel callback dependent information;

means for registering the service with a proxy agent by passing the set of configuration information from the operating system dependent information to the proxy agent; and means for causing a launching of the service with the operating system dependent information and the proxy agent, the service to run on a computer.

* * * * *